April 30, 1940.  E. A. MARSH  2,199,005
TAPE APPLYING AND CUTTING APPARATUS
Filed Dec. 6, 1937   5 Sheets-Sheet 2
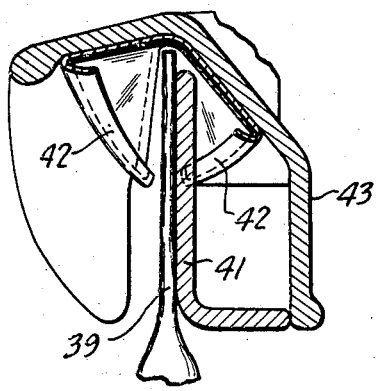
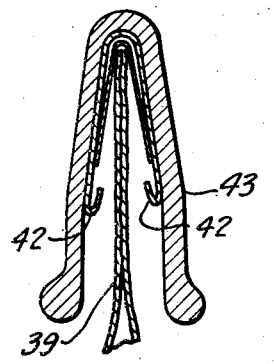
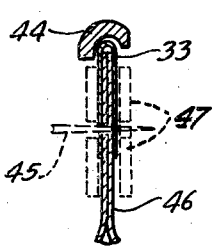
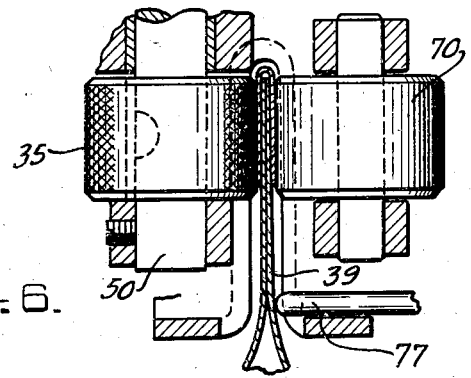
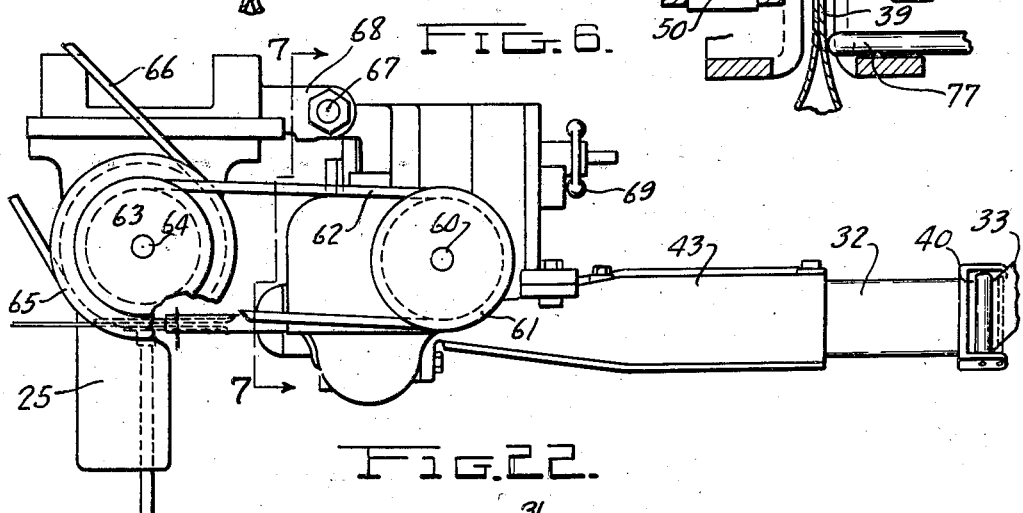
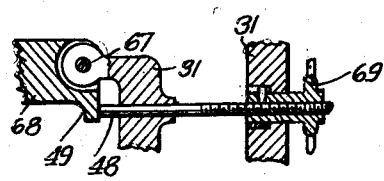
INVENTOR
Esli A. Marsh
BY Owen - Owen
ATTORNEYS

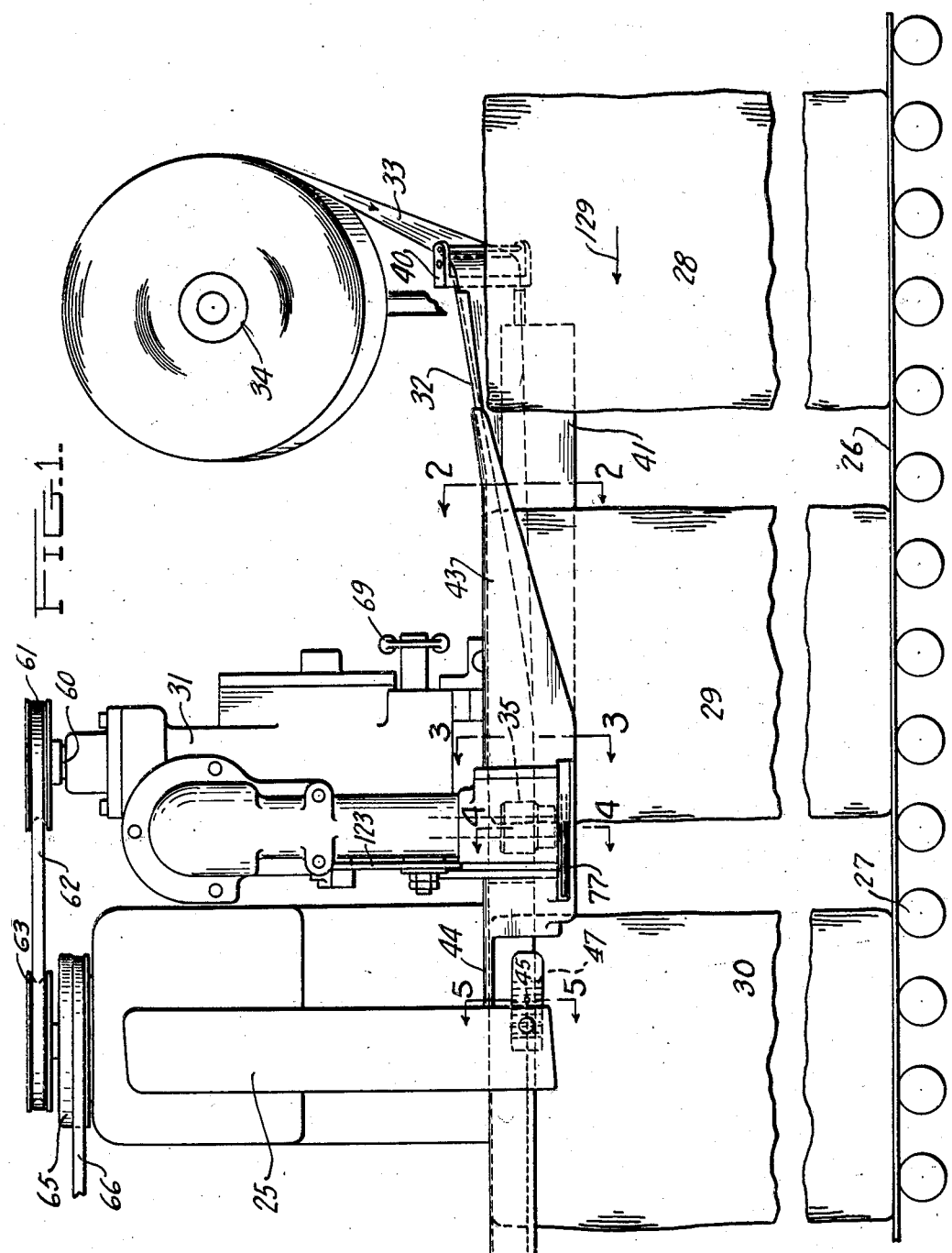

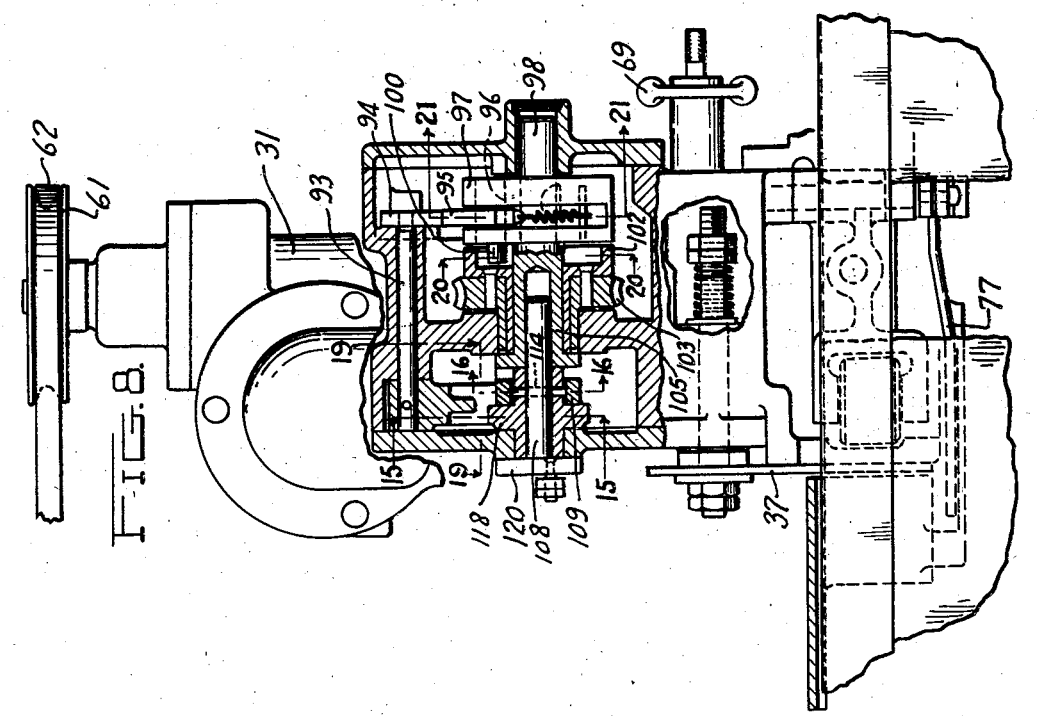

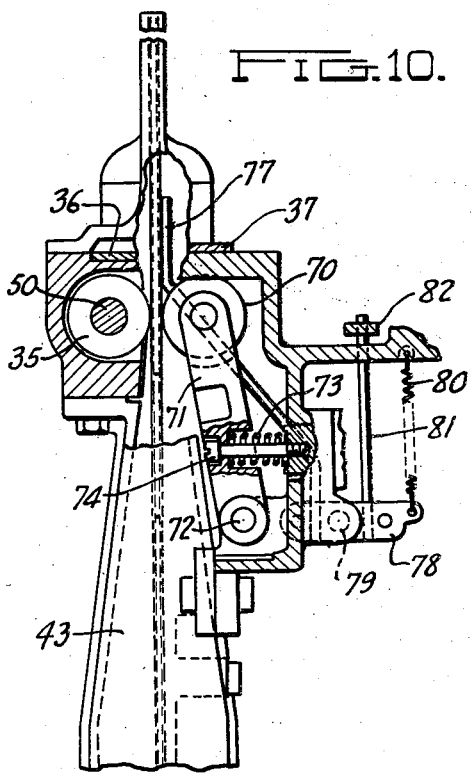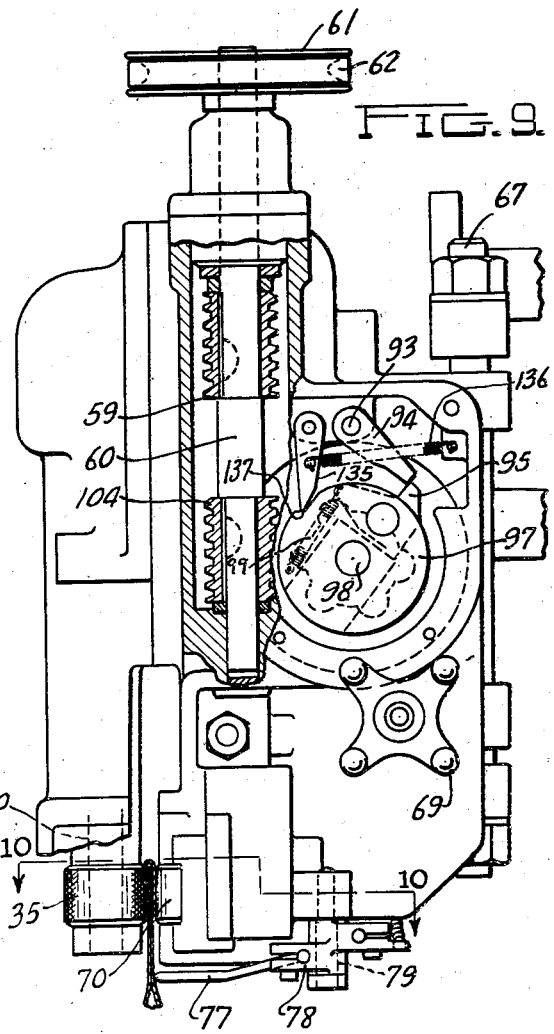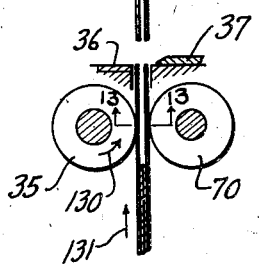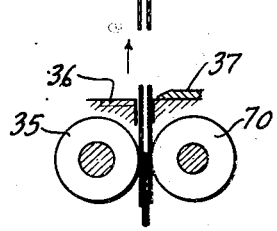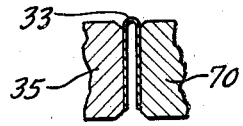

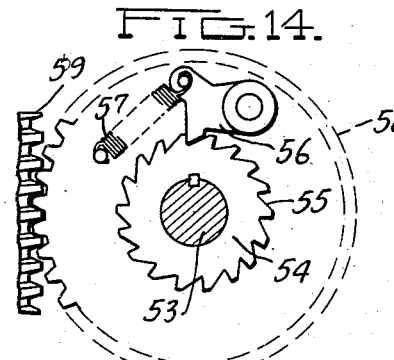
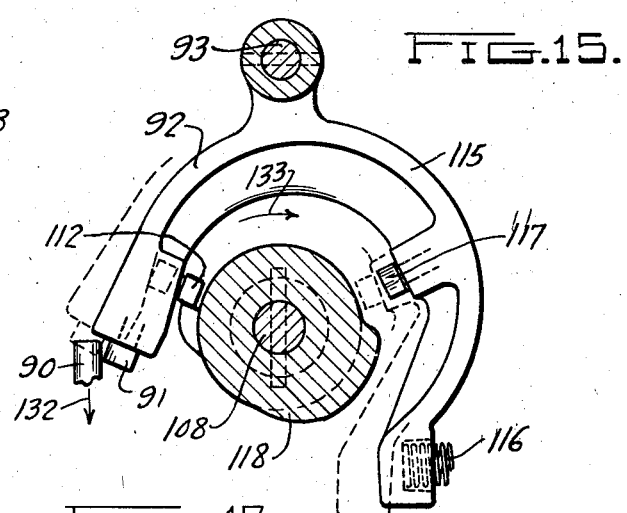
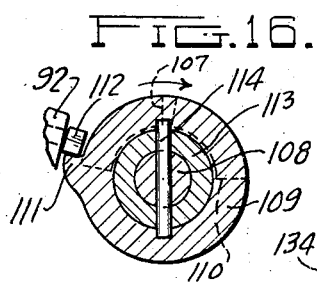
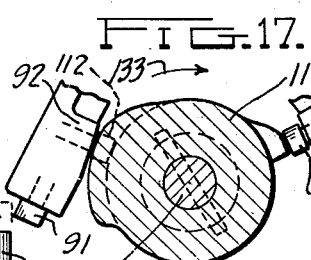
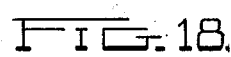
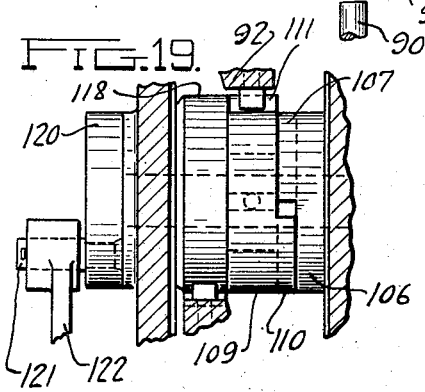
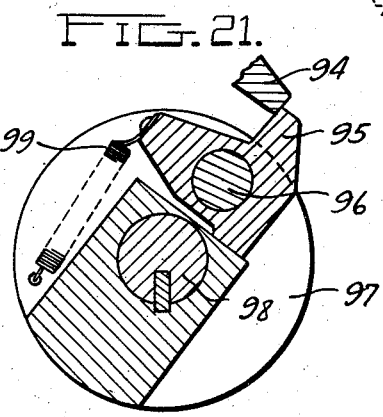
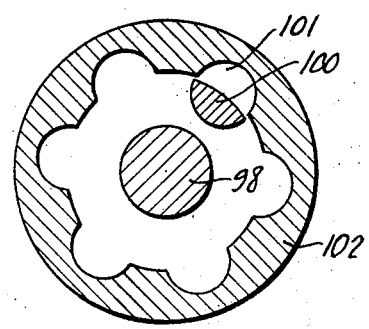

Patented Apr. 30, 1940

2,199,005

UNITED STATES PATENT OFFICE 2,199,005

TAPE APPLYING AND CUTTING APPARATUS

Esli A. Marsh, Oswego, N. Y., assignor to St. Regis Paper Company, New York, N. Y., a corporation of New York Application December 6, 1937, Serial No. 178,269

12 Claims. (Cl. 112—11)

This invention relates to a tape applying and cutting apparatus and has for its object an apparatus which will apply tape to an article such as a bag, will feed the tape only while the article is being moved in cooperative relation with the applying apparatus, and will sever the tape at a predetermined point with relation to the article to which it has been applied.

More particularly, the object is to provide an apparatus which will apply tape to the ends of bags which are fed in succession past the applying means, will feed and apply the tape only while a bag end is being fed past the applying means, and will sever an applied length of tape at a predetermined point with respect to the bag end. The apparatus is particularly devised for use in connection with a sewing machine, where the tape is applied to the end of a bag and then a seam is sewed through the tape and bag end. It is shown arranged for use in closing the mouths of filled bags, and is especially useful for that purpose.

In the accompanying drawings forming a part of this specification,

Fig. 1 is a somewhat diagrammatic front elevation of apparatus embodying one form of the invention;

Figs. 2, 3, 4 and 5 are enlarged detail sections on lines 2—2, 3—3, 4—4, and 5—5 respectively of Fig. 1;

Fig. 6 is a plan view of the parts shown in Fig. 1;

Fig. 7 is a section on the line 7—7 of Fig. 6, with parts broken away;

Fig. 8 is a section substantially on the line 8—8 of Fig. 7;

Fig. 9 is an elevation of the tape applicator portion of the apparatus viewed from the right of Fig. 1 and with parts broken away;

Fig. 10 is a section on the line 10—10 of Fig. 9;

Figs. 11 and 12 are diagrammatic views of the tape feeding operation;

Fig. 13 is a detail section on the line 13—13 of Fig. 11;

Fig. 14 is a section on the line 14—14 of Fig. 7;

Figs. 15 and 16 are detail sections on the lines 15—15 and 16—16 respectively of Fig. 8;

Figs. 17 and 18 are views similar to Figs. 15 and 16, but showing the parts in a different position;

Figs. 19, 20 and 21 are sections on lines 19—19, 20—20 and 21—21 respectively of Fig. 8.

Fig. 22 is a view showing the adjustment of the tape-applying casing.

In the apparatus shown in the drawings there is indicated a sewing machine 25 which may be of any well known construction, and which constitutes no part of the present invention, and therefore is not shown in detail. Likewise there is shown diagrammatically a belt conveyor 26 supported by rollers 27 and carrying a row of filled bags, three of which are indicated at 28, 29 and 30.

The chief feature of the invention is a tape applying and cutting device indicated generally by 31, and comprising a tape guide 32 for a tape 33 which is fed from any convenient tape reel indicated diagrammatically at 34. It also comprises a feeding roller 35, a stationary cutting knife 36, (see Figs. 10, 11 and 12) and a movable cutting knife 37. The general arrangement of the machine as outlined above is indicated on Fig. 1.

The drawings show the application of the tape to the top 39 of bag 29. Tape guide 32 is provided with a receiving end 40 which properly directs tape 33 into guide 32. Guide plate 41 is provided, against which the closed upper end of the bag may be laid in order to guide the bag top into proper relation with the tape guide. Guide 32 is provided with flanged edges 42 which receive the edges of the tape and hold the tape in position. In the construction shown it will be seen that the tape is received initially at an angle of about 45° and then progressively bent into shape over the top of the bags by the guides, as indicated somewhat diagrammatically in Figs. 2 to 5 inclusive. In the construction shown there is provided a guard 43 over the tape guide 32, and the guard is provided with an extending portion 44 which extends over the path of the tape until it reaches the sewing position so as to aid in insuring correct position of the tape with respect to the bag, until it is finally affixed by the sewing operation, the sewing needle being diagrammatically indicated at 45 in Fig. 5. While the tape is being applied to the top 39 of the bag 29, it is being sewed to the top 46 of bag 30, when the bags are spaced as shown in the drawings. The sewing machine is indicated as being provided with a feed dog 47. (See Fig. 1).

The active moving parts for feeding and applying the tape comprise feed roller 35 and knife 37, as indicated above. The apparatus by which these parts are rendered operative at the desired times will be described next.

Roller 35 is mounted upon the lower end of a shaft 50 which carries on its upper end a miter gear 51 meshing with a miter gear 52 on the end of a horizontal shaft 53. Fixed on shaft 53 there is a clutch member 54 provided with teeth 55 adapted to be engaged by a pawl 56. The pawl is normally urged into engagement with the teeth by a spring 57. The pawl and spring are carried by a worm wheel 58 loose upon shaft 53 and constantly driven by a worm 59 upon a vertical shaft 60. On the upper end of shaft 60 there is a pulley 61 driven by a belt 62 from a pulley 63 upon the upper end of the drive shaft 64 of the sewing machine. The sewing machine may be operated in any desired way, but in the drawings it is shown as being provided with a drive pulley 65 driven by a belt 66 from any suitable source of power.

The apparatus may be mounted in any convenient way, but a very simple and advantageous mounting is indicated in Fig. 6 where the casing of the tape applying and cutting means is shown pivoted at 67 upon a bracket 68 attached to the frame of the sewing machine. The belt 62 tends to draw the shaft of the tape applying device towards the sewing machine, and a suitable stop screw 48 operated by handle 69 abuts a stop 49 on bracket 68 (see Fig. 22) and prevents the tape applying apparatus from swinging too far in the direction in which it is urged by the belt. It will be readily seen that such a mounting makes it very easy to swing the tape applying means back out of the way if the apparatus is to be used for sewing bags to which tape is not applied, and it can be as easily swung back into position when tape is to be applied.

It will be seen that the means described constantly drives roller 35 at a minimum peripheral speed. This speed is preferably not greater than the speed of the belt 26, any slight variation being on the slow side. The over-running clutch provided by ratchet wheel 55 and pawl 56 makes it possible to feed the tape faster than wheel 35 is driven, as will be described more fully later.

In order to make drive wheel 35 operate, there is provided an abutment roller 70, mounted upon an arm 71, pivoted at 72, as best shown on Fig. 10. Arm 71 and its roller 70 are constantly urged towards roller 35 by means of a spring 73, but the approach of roller 70 to roller 35 is exactly limited by a stop screw 74. It will be seen that in this way the abutment roller 70 is yieldingly held at an exactly predetermined distance from roller 35 until the force of the spring is overcome.

In order to operate the cutting knife at the desired time there is an operating mechanism timed by a tripping finger 77 which normally rests against the bag top while a bag is passing the point where the cutters are located. As shown on Fig. 10, tripping finger 77 is mounted upon a carrier 78 pivoted upon the frame of the device at 79. A spring 80 urges the finger against the bag, and when a bag passes the finger the spring swings the finger into the space behind the bag, as will be readily understood. Carrier 78 is provided with a pin 81 which projects loosely through the lower end of a lever 82, which is pivoted on the frame at 83, as best shown on Fig. 7. Lever 82 carries a tripping pawl 84 normally urged outward by a spring 85, but limited as to its outer movement by a screw 86. The free end of pawl 84 is adapted to engage a head 87 on a pin 88 which is normally urged upward by a spring 89 until the shouldered lower end of the rod contacts the fixed collar on which the lower end of the spring rests. The upper end 90 of pin 88 is normally in stopping relation with a hardened abutment member 91 on a rock arm 92 fastened to rock shaft 93. On the other end of shaft 93 (see Figs. 8, 9 and 21) there is a stop member 94 normally engaging a tooth on a trip member 95 pivoted at 96 upon a clutch member 97 keyed on shaft 98. A spring 99 tends to swing trip member 95 so as to engage the clutch. The end of pivot 96 is cut away so as to form a partially circular member 100. When the trip member 95 is freed by stop member 94, it is swung by spring 99 so as to turn its end 100 into the oncoming notching 101 of driving member 102 of the clutch. Drive member 102 is rigidly fastened upon a worm wheel 103 which engages a worm 104 on shaft 60.

Worm wheel 103 is loosely mounted upon a sleeve 105 rigid with member 97. The opposite end of sleeve 105 is provided with a flange 106, having a tooth 107 (see Figs. 8 and 19). A shaft 108 rotates loosely within sleeve 105. A clutch member 109 rotates with shaft 108 and is provided with a tooth 110 adapted to engage tooth 107. Member 109 is also provided with a tooth 111 adapted to engage a stop member 112 mounted upon arm 92. A cam hub 113 is mounted upon shaft 108 by means of a pin 114 which passes through shaft 108 and hub 113 into clutch member 109, so that all three parts rotate in unison.

A rock arm 115 is mounted upon shaft 93 and in the form shown is integral with arm 92. A spring 116 normally urges rock arm 115 to the left as viewed in Figs. 7 and 15. The arm is provided with an abutment 117 which is engaged by cam 118 on hub 113 during the rotation of that member.

On the end of shaft 108 there is a disc 120 provided with a crank pin 121. Pin 121 is connected by a link 122 to the upper end 123 of lever 124, which carries the movable knife blade 37. A spring 125 constantly urges lever 124 in the cutting direction (see Fig. 7).

The operation of the apparatus will be fairly clear from the foregoing description, but for convenience the successive steps in the operation will be briefly reviewed.

As indicated in Fig. 1, the apparatus is particularly devised for the closing of the mouths of filled bags by forming across such mouths seams reinforced by a suitable tape. Filled bags are moved by the supporting conveyor in succession into cooperative relation with the apparatus. As a bag comes opposite plate 41, the top of the bag is collapsed and placed against that plate so that the closed top of the bag enters properly between the sides of the tape, as will clearly appear from Figs. 2 and 3. It is presumed that at the time this takes place the tape will have been cut off and end just beyond the tape feeding rolls, as indicated on Fig. 11. It will be seen that in this position the approach of roll 70 towards roll 35 is stopped by screw 74 so that no pressure is exerted upon the tape, and therefore no feeding force is exerted, although roll 35 is constantly turning in the direction indicated by arrow 130 on Fig. 11. The bag top is moved along with the bag in the direction of arrow 129 on Fig. 1 and of arrow 131 on Fig. 11 until the forward edge of the bag is in the bite of the rolls 35 and 70, as indicated upon Fig. 12. It will be readily seen that the thickness of the bag between the sides of the tape spreads the tape so that it is forced into frictional engagement with the feed rolls 35 and 70, and thereupon the feeding action of the rolls becomes effective.

The bag is thereafter carried along by belt 26 and the tape is pulled from reel 34 and fed forward with the bag top by driven roll 35. The speed of the roll should be approximately the same as the speed of belt 26 so that the top and bottom of the bag will move along together. This feeding action continues until the forward end of the tape and bag enters the sewing machine.

It will be understood that the sewing machine is of the usual type and is provided with the usual feed dog 47 or other feeding mechanism customary in sewing machines, so that the feeding of the tape and bag top through the sewing machine is controlled by the usual sewing machine feeding mechanism, which need not be described in detail, as any conventional means will accomplish the purpose. It is necessary that the feed rolls should be near enough to the feeding means of the sewing machine so that the sewing machine feed will become effective upon the tape at least, and preferably upon the tape and bag top, before the bag top has passed the feed roll 35, so that the feeding of the bag top and tape will be continuous as it enters between rolls 35 and 70 until the sewing machine has accomplished its function. As shown in the drawings, the rolls 35 and 70 are less than a bag width from the sewing machine.

As previously indicated, the feed roll 35 is driven through an over-running clutch. While its speed is preferably very nearly that of the feeding device on the sewing machine, any difference in the speed should be on the slow side. If the sewing machine feed is slightly faster than the feed by roll 35, the movement of the tape and bag through the sewing machine will be determined by the speed of the sewing machine feed as the bag enters the sewing machine, the overrunning clutch preventing any materially retarding effect by roll 35.

When the rear edge of the bag passes from between rolls 35 and 70 the tape is no longer pinched between those rolls, and therefore no further feeding friction is exerted upon the tape; but nevertheless the tape continues to be drawn forward by the feeding device of the sewing machine until the rear edge of the bag passes the end of finger 77, thereupon the finger is swung by spring 80 in back of the bag, and at the same time rod 81 actuates lever 82, and engagement of pawl 84 with head 87 draws rod 90 downward in the direction of arrow 132 on Fig. 15. The movement of lever 82 is sufficient so that pawl 84 slips from head 87 and allows the upward movement of the rod by spring 89. But before this takes place, spring 116 snaps rock arms 115 and 92 to their dotted line position as shown on Fig. 15. This rocks shaft 93 and moves stop arm 94 out of contact with tooth 95, which results in the closing of the clutch, which starts the turning movement of part 97, and through intermediate connections the movement of tooth 107.

But immediately upon the swinging of arm 92 to its dotted line position, tooth 111 is freed from stop 112, and spring 125 thereupon snaps lever 124 and knife 37 through its cutting movement. This severs the tape, this severance taking place almost instantly upon the finger 77 dropping behind the bag. Disc 120 and its connected parts are moved through an arc of somewhat less than 180° by action of spring 125 when tooth 111 is freed by the movement of abutment 112 as described. This moves the parts from the position in which they are shown on Figs. 15 and 16, in the direction of arrow 133, to the positions in which they are shown in Figs. 17 and 18. It will be seen that during this movement cam 118 contacts abutment 117 and returns arms 115 and 92 to their original position, so that pin 90 can be returned to its upper position in the direction indicated by arrow 134 on Fig. 17.

This snap action moves tooth 110 in advance of tooth 107, but through the action of the clutch, as described above, tooth 107 is started into movement at about the same time, and soon catches up with tooth 110, and thereafter continues to move tooth 110 and the connected parts around to their original position. The return of arms 92 and 115 to their original positions returns stop 94 to its original position, so that it stops the rotation of the clutch at the end of one revolution. Therefore the parts stop in the original position. A stop 135 is urged by a spring 136 into a notch 137 in member 97 so as to prevent any backlash when the clutch is opened.

The tape applying device and cutter remain quiescent until another bag top is fed between the rolls 35 and 70, whereupon, the operation is repeated. It will be seen that this results in the tape being cut behind the bag at a predetermined point, depending upon the length and arrangement of finger 77, and that the tape extends ahead of the forward edge of the bag a distance depending upon the relative position of the rolls and the cutting knife. Accordingly, suitable lengths of tape may be applied to the tops of successive bags automatically, and extend the predetermined desired distance on both sides of the bag regardless of the exact spacing of the bags upon the conveyor belt. This is a very obvious advantage.

While the tape applying and cutting device has been fully described in connection with apparatus for closing the tops of filled bags, it will be readily apparent that it might be applied, with suitable changes in the apparatus, to applying tape to the ends of empty bags. Also in its broader aspects it might be employed with articles other than bags. The arrangement is particularly designed for use with a sewing machine so as to properly apply a tape that is sewed onto the bag, but in its broader aspects it might be employed with an adhesive tape or tape that was secured to the bag by other means, in which case the applying and severing device would operate in the same way, although it would not have the peculiar advantage which arises from this combination of the tape applying means with the sewing machine.

While roller 35 is referred to in the specification and claims as being constantly driven, it will be seen by reference to the drawings and description that this is true only while the sewing machine is running. This is preferable, since it prevents feeding the bag to the sewing machine except while the machine is running and ready to receive it, and thus jamming at the sewing machine is avoided.

While the changing of the apparatus to close the ends of empty bags is the most obvious modification, and some other modifications have been mentioned, it will be understood that other modifications of the apparatus may be employed within the scope of the appended claims.

What I claim is:

1. Apparatus for closing bag ends, comprising a sewing machine having feeding means, means to convey bags in succession with their ends passing through the sewing machine, a tape guide in position to guide tape onto the bag ends as they approach the sewing machine, a tape cutter between the guide and the sewing machine, means actuating the cutter when the rear side of a bag is past the cutter a predetermined extent, and means to feed the tape with a bag end to the feeding means of the sewing machine.

2. Apparatus for closing bag ends, comprising a sewing machine, a conveyor adapted to convey bags in succession past the sewing machine with their ends in position to be sewn, a tape guide in position to guide tape onto the bag ends as it approaches the sewing machine, friction feed rolls on opposite sides of the tape and bag end as the bag end is moved through the guide, means constantly driving at least one of said rolls, the rolls being spaced far enough apart to avoid feeding friction when tape alone is between them, and near enough together to exert feeding friction when the tape and bag end are both between them, a cutter between the feed rolls and the sewing machine, and means automatically operating the cutter when the rear edge of a bag has moved a predetermined distance past the cutter.

3. Apparatus for closing bag ends, comprising a sewing machine, a conveyor adapted to convey bags in succession past the sewing machine with their ends in position to be sewn, a tape guide in position to guide tape onto the bag end as it approaches the sewing machine, friction feed rolls on opposite sides of the tape and bag end as the bag end is moved through the guide, means constantly driving at least one of said rolls, the rolls being spaced far enough apart to avoid feeding friction when tape alone is between them, and near enough together to exert feeding friction when the tape and bag end are both between them, a cutter between the feed rolls and the sewing machine, and means automatically operating the cutter when the rear edge of a bag has moved a predetermined distance past the cutter, the sewing machine having feeding means operating at least as fast as the feed rolls.

4. Apparatus for closing bag ends, comprising a sewing machine, a conveyor adapted to convey bags in succession past the sewing machine with their ends in position to be sewn, a tape guide in position to guide tape onto the bag end as it approaches the sewing machine, friction feed rolls on opposite sides of the tape and bag end as the bag end is moved through the guide, means constantly driving at least one of said rolls through an over-running clutch, the rolls being spaced far enough apart to avoid feeding friction when tape alone is between them and near enough together to exert feeding friction when the tape and bag end are both between them, a cutter between the feed rolls and the sewing machine, and means automatically operating the cutter when the rear edge of a bag has moved a predetermined distance past the cutter, the sewing machine having feeding means operating at least as fast as the feed rolls.

5. Apparatus for closing the mouths of filled bags, comprising a conveyor adapted to convey filled bags in succession with their mouths up, a sewing machine in position to sew the bag mouths in succession, the sewing machine having a vertical shaft, tape applying means mounted upon a vertical pivot on the side of the sewing machine which the bags approach before they are sewed, said means comprising a vertical shaft, a belt drive between said vertical shafts, and an adjustable stop limiting the movement of the tape applying means about its pivot, and determining the proper position of the tape applying means with respect to the conveyor and sewing machine.

6. Apparatus for closing the mouths of filled bags, comprising a sewing machine, a conveyor adapted to convey filled bags in succession with their mouths in position to be sewn by said sewing machine, a tape guide spaced the height of the bag above the conveyor in the path of the bag tops as they approach the sewing machine, a cutter between the guide and the sewing machine, and tape-feeding means between the cutter and guide.

7. Apparatus in accordance with claim 6, and the sewing machine comprising feeding means running at least as fast as said tape-feeding means.

8. Apparatus in accordance with claim 6, and the sewing machine comprising feeding means and the tape-feeding means being rendered active only while a bag top is passing through the tape-feeding means.

9. Apparatus in accordance with claim 6, and the sewing machine comprising feeding means spaced from said tape-feeding means less than the length of tape applied to one bag.

10. Apparatus in accordance with claim 6 and the sewing machine comprising feeding means spaced from the tape-feeding means less than the length of tape applied to one bag, and the tape-feeding means being constructed to effectively feed the tape only when a bag top is moving through the tape-feeding means with the tape.

11. Apparatus for closing the mouths of filled bags, comprising a sewing machine having feeding means, a conveyor adapted to convey a series of filled bags with their mouths in position to be sewed in succession by the sewing machine, a tape guide in the path of the bag tops before they reach the sewing machine, a tape cutter between the guide and the sewing machine, tape-feeding means between the cutter and guide and nearer to the sewing machine feeding means than the length of tape applied to one bag, means driving the tape-feeding means through an over-running clutch at a speed not greater than the speed of the sewing machine feeding means, the tape-feeder being operative only while a bag top is passing therethrough with the tape, and trip means actuating the cutter when a bag top has passed a predetermined distance beyond the tape-feeding means.

12. Apparatus for closing bag ends, comprising a sewing machine, means to convey bags in succession with their ends passing through the sewing machine, a tape guide in position to guide tape onto the bag ends as they approach the sewing machine, a tape cutter between the guide and the sewing machine, means actuating the cutter when the rear side of a bag is past the cutter a predetermined extent, and means to feed the tape with a bag end to the sewing machine, the last said means comprising feed rolls on the side of the cutter away from the sewing machine and upon opposite sides of the tape and bag end, means constantly driving at least one of said rolls, and means spacing the rolls far enough to receive the tape alone without feeding friction, but not far enough to avoid feeding friction upon the tape and bag end together.

ESLI A. MARSH.